United States Patent
Tate et al.

(10) Patent No.: US 8,126,914 B2
(45) Date of Patent: Feb. 28, 2012

(54) SELECTING A RESOURCE MANAGER TO SATISFY A SERVICE REQUEST

(75) Inventors: Stewart Eugene Tate, San Jose, CA (US); Cataldo Mega, Tuchingen (DE); James Allen Reimer, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/089,094

(22) Filed: Mar. 23, 2005

(65) Prior Publication Data

US 2006/0218127 A1    Sep. 28, 2006

(51) Int. Cl.
*G06F 17/30* (2006.01)
(52) U.S. Cl. ........................ 707/781; 705/7.12
(58) Field of Classification Search ............. 707/781; 705/7.12
See application file for complete search history.

(56) References Cited

U.S. PATENT DOCUMENTS 5,341,477 A    8/1994    Pitkin et al.
(Continued)

FOREIGN PATENT DOCUMENTS

EP    1126371    8/2001
(Continued)

OTHER PUBLICATIONS

PCT Search Report and Written Opinion, Jun. 7, 2006, for International Application No. PCT/EP2006/060688.

Tan, Y.S., V. Vellanki, J. Xing, B. Topol, & G. Dudley, "Service Domains", IBM Systems Journal, vol. 43, No. 4, pp. 734-755 (Sep. 1, 2004).

(Continued)

*Primary Examiner* — Hosain Alam
*Assistant Examiner* — Johnese Johnson
(74) *Attorney, Agent, or Firm* — David W. Victor; Konrad Raynes & Victor, LLP (57) ABSTRACT

Provided are a method, system, and article of manufacture for selecting a resource manager to satisfy a service request. A catalog indicating a plurality of resource managers and at least one service offered by the resource managers is provided. Further provided is resource manager information indicating resource availability information for resource managers offering at least one service. A request for a requested service from a subscriber is received. The catalog is processed to identify resource managers publishing the requested service and the resource manager information is processed to determine at least one identified resource manager publishing the requested service that also satisfies at least one rule applicable to the service request.

21 Claims, 5 Drawing Sheets

U.S. PATENT DOCUMENTS

| | | | |
|---|---|---|---|
| 5,459,837 A | 10/1995 | Caccavale | |
| 6,704,906 B1 | 3/2004 | Yankovich et al. | |
| 2002/0111824 A1 | 8/2002 | Grainger | |
| 2003/0084140 A1 | 5/2003 | Takeuchi et al. | |
| 2004/0128555 A1 | 7/2004 | Saitoh et al. | |
| 2006/0218601 A1* | 9/2006 | Michel | 725/87 |
| 2007/0083899 A1* | 4/2007 | Compton et al. | 725/87 |

FOREIGN PATENT DOCUMENTS

| | | |
|---|---|---|
| JP | 5134959 A | 6/1993 |
| JP | 2003131960 A | 5/2003 |
| JP | 2004259092 A | 9/2004 |

OTHER PUBLICATIONS

English Abstract and Machine Translation for JP5134959A, published Jun. 1, 1993, Total 15 pp.

English Abstract for JP2003131960A, published May 9, 2003, Total 1 p (has English counterpart US2003/0084140).

English Abstract and Machine Translation for JP2004259092A, published Sep. 16, 2004, Total 42 pp.

IDS Report, Sep. 2, 2011, from the Aug. 9, 2011 Office Action, Total 3 pp.

* cited by examiner

FIG. 1

Catalog Entry

FIG. 2

Resource Manager Information

SELECTING A RESOURCE MANAGER TO SATISFY A SERVICE REQUEST

BACKGROUND OF THE INVENTION

1. Field of the Invention

The present invention relates to a method, system, and program for selecting a resource manager to satisfy a service request.

2. Description of the Related Art

In a content management system, a catalog is maintained indicating resource manager systems capable of providing services to subscribers. A subscriber connects to the content manager and requests a particular service listed in the catalog. The content manager then locates a resource manager in the catalog capable of providing the service and routes the service request to the resource manger. For instance, the service may comprise a file to download and the resource manager may comprise a node or system in the network indicated in the catalog that is capable of serving that requested file/service to the requesting subscriber. Additionally, if objects are being loaded into the content manager system, the file is routed to a resource manager to store.

SUMMARY

Provided are a method, system, and article of manufacture for selecting a resource manager to satisfy a service request. A catalog indicating a plurality of resource managers and at least one service offered by the resource managers is provided. Further provided is resource manager information indicating resource availability information for resource managers offering at least one service. A request for a requested service from a subscriber is received. The catalog is processed to identify resource managers publishing the requested service and the resource manager information is processed to determine at least one identified resource manager publishing the requested service that also satisfies at least one rule applicable to the service request.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
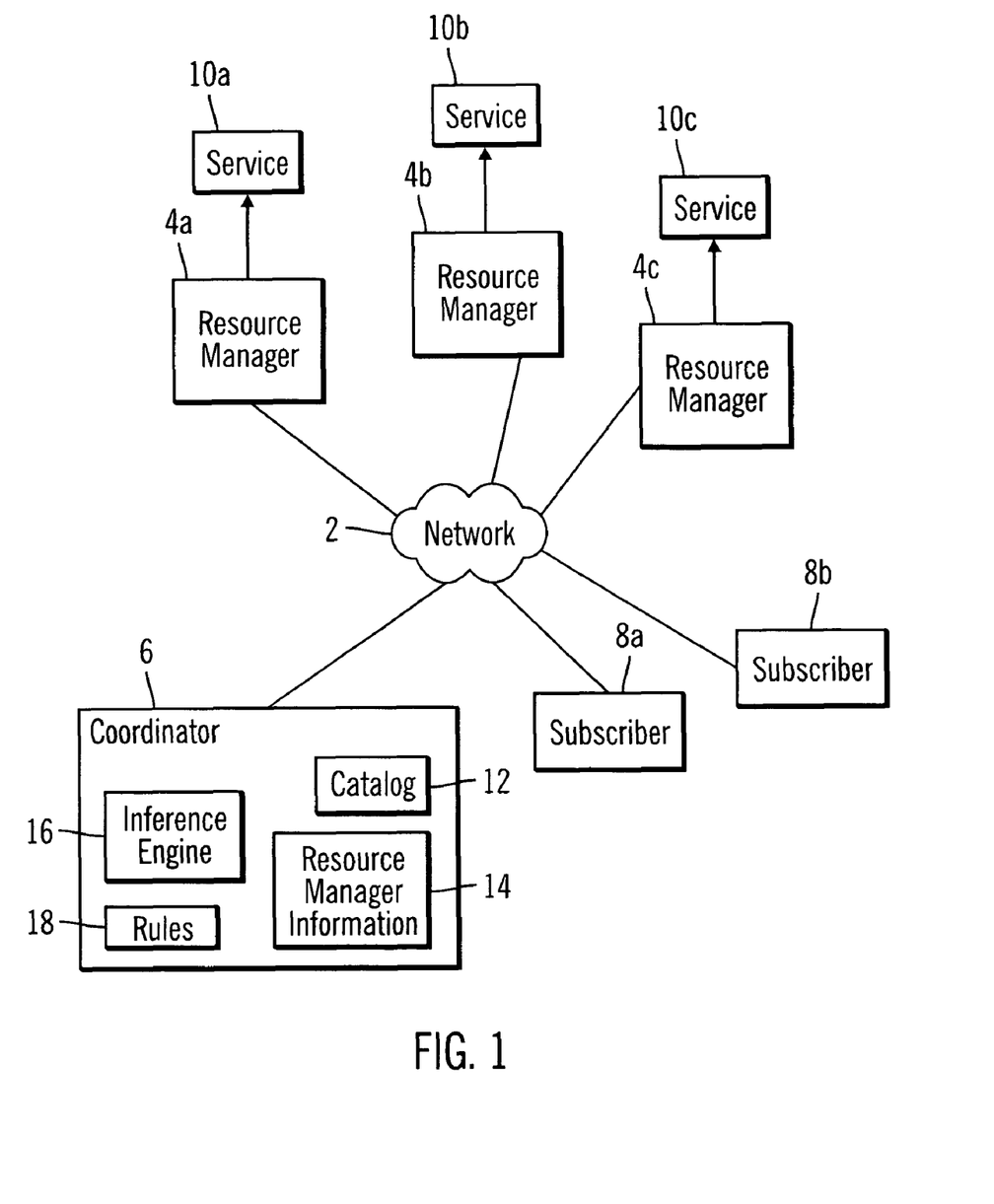
FIG. 1 illustrates an embodiment of a network environment providing access to services.

FIG. 1 illustrates a network environment comprising a network 2 connecting resource managers 4a, 4b, 4c, a coordinator 6, and subscribers, 8a, 8b. There may be any number of resource managers, coordinators, and subscribers in the system. The network may comprise a suitable network known in the art, such as a Local Area Network (LAN), Storage Area Network (SAN), Cluster File System, a grid, etc. A resource manager 4a, 4b, 4c is a computer system that publishes or provides access to one or more services 10a, 10b, 10c. A service may comprise a data service (e.g., storage or retrieval of objects, files, etc.) or a computational service (e.g., a search engine, database application, etc.). The objects subject to a data service may comprise files, records, programs, etc. A subscriber 8a, 8b comprises a system that requests a service. A coordinator 6 tries to link up the subscriber 8a, 8b service request with a resource manager 4a, 4b, 4c publishing the requested service. The coordinator 6 includes a catalog 12 identifying services offered by the resource managers 4a, 4b, 4c, resource manager information 14 providing performance information and technical properties on the resource managers 4a, 4b, 4c registered in the catalog 12, and an inference engine 16 that processes rules 18 to select one resource manager 4a, 4b, 4c publishing the requested service to use to provide the service in a manner that complies with the rules 18.

Figure 2:
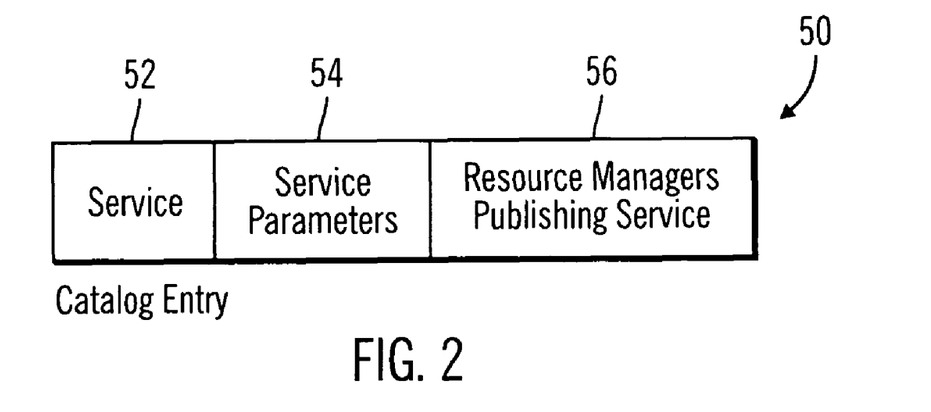
FIG. 2 illustrates an embodiment of a catalog entry.

FIG. 2 illustrates an embodiment of a catalog entry 50 providing information on an available service, e.g., data or computational service. The service 10a, 10b, 10c may comprise: a storage service providing storage capacity to store requested files or objects; objects that a user may want to access, where each object accessible through a catalog 12 may comprise a separate service, such as multi-media files or programs to download; storage archival and retention services; and computational services, such as a search engine, database application, etc. Each catalog entry 50 may include a service field 52 indicating the type of service available through the catalog 12, e.g., data or computational service. The service parameters 54 provide information about the service. For instance, if the service comprises a file to download, then the service parameters provide information on the file, such as file name, size, type, access frequency, availability, etc. If the service comprises available storage, then the service parameters 54 may indicate information on the type of storage, e.g., RAID level, hardware redundancy, etc. If the service comprises a computational resource, then the service parameters 54 provide information on the type of computational resource, such as a search engine, database application, etc. The catalog entry 50 may also indicate resource managers 56 publishing the service.

Figure 3:
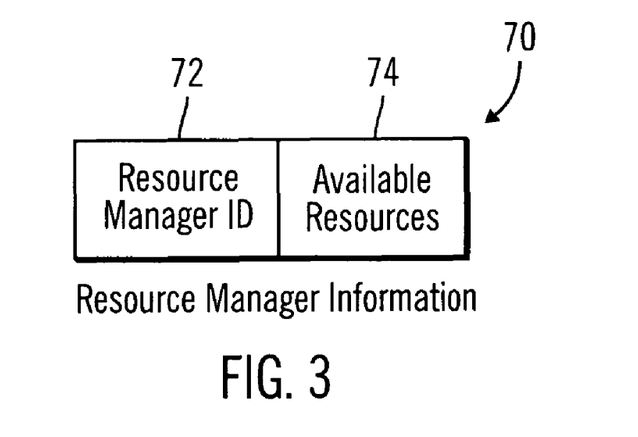
FIG. 3 illustrates an embodiment of resource manager information.

FIG. 3 illustrates information 70 for a resource manager 4a, 4b, 4c maintained in the resource manager information 14, including: a resource manager identifier (ID) 72 and available resources 74 at the identified resource manager, such as available storage space, available computational resources, available bandwidth, number of users accessing the resource manager, hardware redundancy, technical specifications, such as supported protocols and interfaces, etc.

Figure 4:
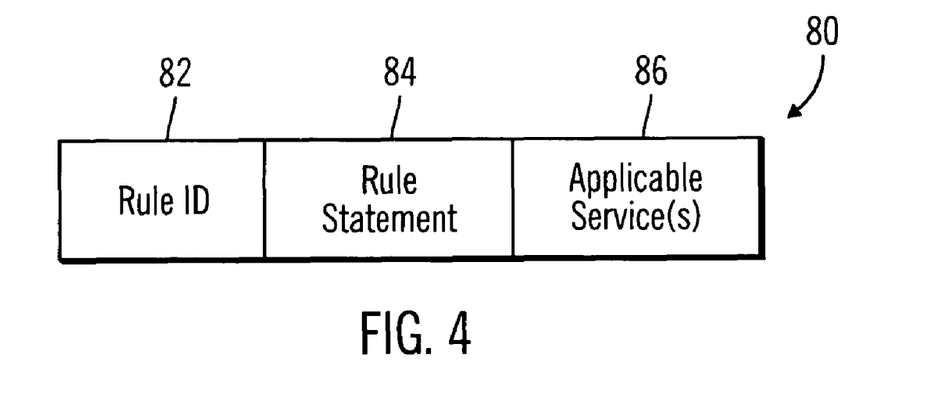
FIG. 4 illustrates an embodiment of the content of a rule.

FIG. 4 illustrates a rule entry 80 in the rules 18 including a rule identifier (ID) 82 and a rule statement 84 specifying one or more actions to take based on a certain condition concerning resource manager and/or subscriber properties. For instance, for a file storage service, the rule may be used to specify a resource manager that can provide the service by specifying certain required storage conditions, such as available space, hardware and data redundancy (e.g., RAID level), availability of the storage device, etc. A file storage service rule may also specify a resource manager based on properties of the object being stored, such as the object's access frequency, size, compression, etc. Additionally, the rule may consider conditions of the subscriber, such as their account level or status, and determine a resource manager that the subscriber may use for the requested service that supports the subscriber status and/or service level. Thus, the rule may consider properties of the resource manager providing/publishing the service, the subscriber requesting the service, and any object or file processed by the service request to determine action to take based on such considered properties. The rule 80 may further indicate applicable services 86 to which the rule applies, such that for the identified service 86, the inference engine 16 applies the rule 80 when the identified service 86 is requested. The inference engine 16 may apply the rules 18 dynamically during runtime to dynamically control the allocation of resources to ensure the conditions required by the rules 18 are satisfied. The rules may further specify service level agreements (SLAs) comprised of quality of service rules (QOS), technical rules, and/or business rules. The rules may also provide for the balancing of hardware and software resources.

The rules may further provide for the provisioning of network resources to offer faster transmissions of data, ensure fault recovery of data transmissions by provisioning the receipt of data from multiple providers, dispatching requests to redundant services to offer fault protection and recovery in the event of a hardware or software failure, and capturing and evaluating the state of hardware resources in realtime (CPU, Memory, I/O, Network) within a system.

The coordinator 6 maintains and uses the catalog 12, resource manager information 14, and rules 18 to determine how to process service requests from subscribers 8a, 8b.

Figure 5A:
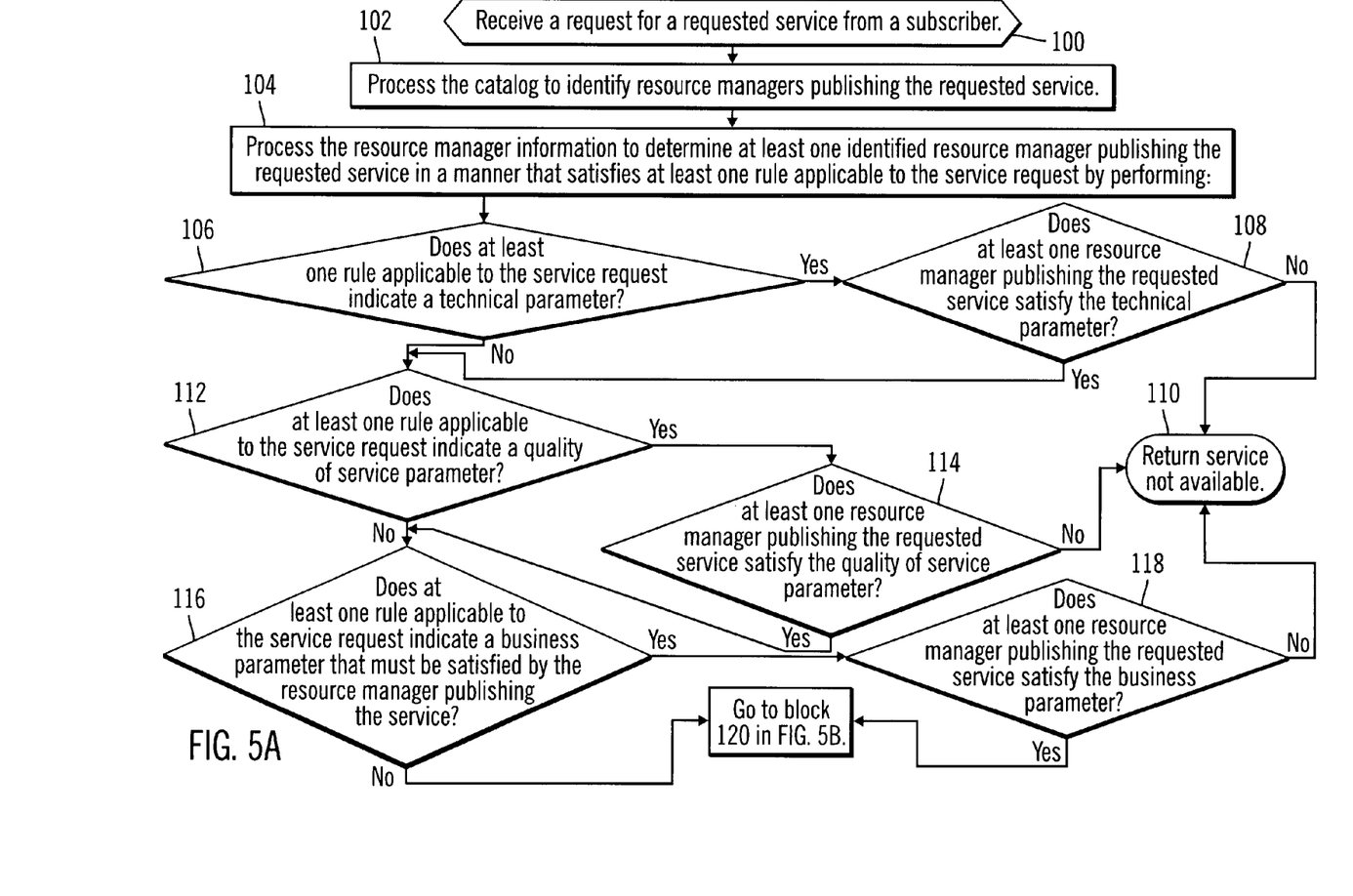
FIGS. 5a and 5b illustrate an embodiment of operations to select one resource manager to provide a service to a subscriber requesting the service.
Figure 5B:
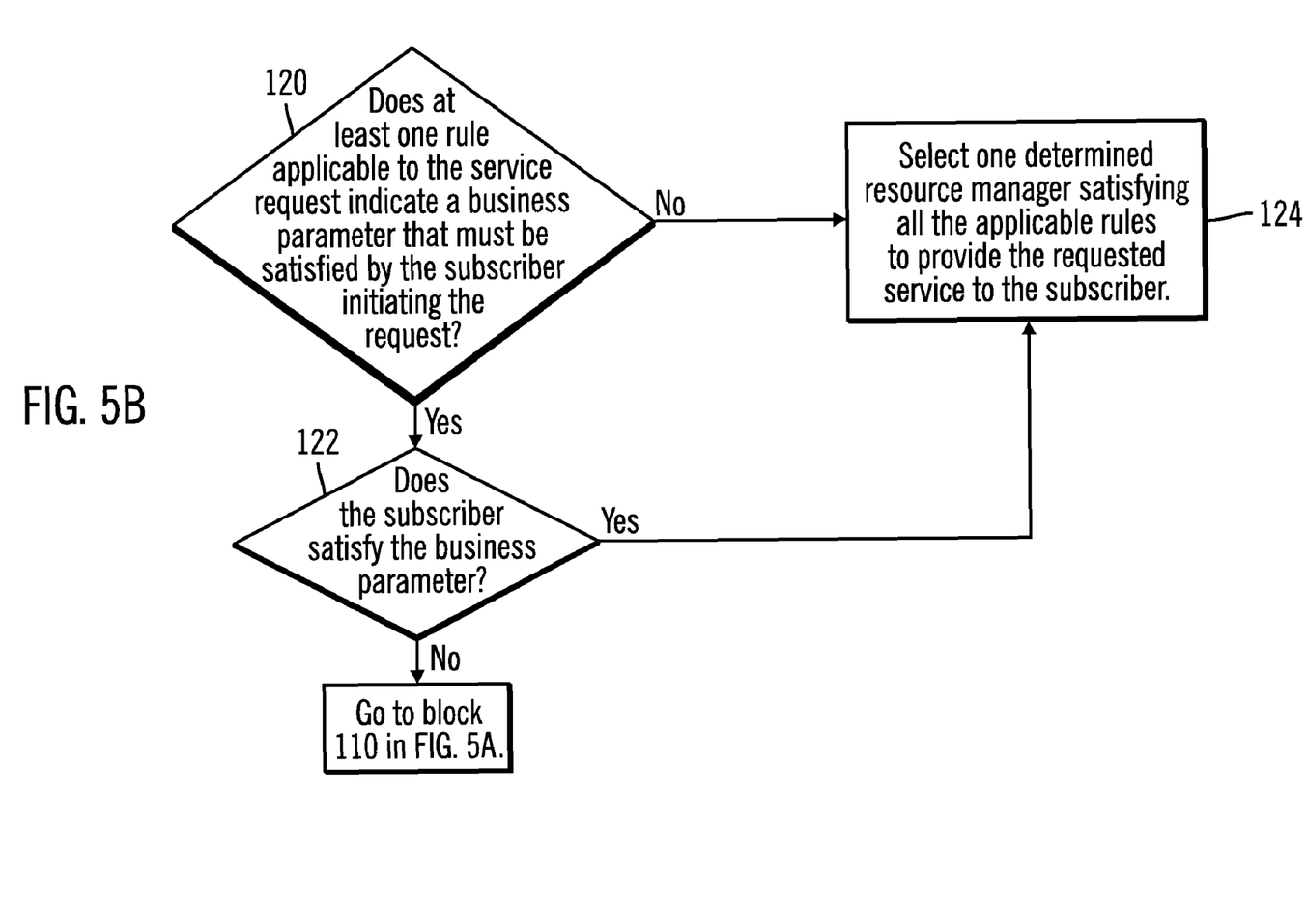

FIGS. 5a and 5b illustrates an embodiment of operations performed by the coordinator 6 to process a service request from a subscriber 8a, 8b. Upon receiving (at block 100) a request for a requested service from a subscriber 8a, 8b, the coordinator 6 processes (at block 102) the catalog 12 to identify resource managers 4a, 4b . . . 4n publishing the requested service. The coordinator 6, or inference engine 16, further processes (at block 104) the resource manager information 14 to determine at least one identified resource manager 4a, 4b, 4c publishing the requested service in a manner that satisfies at least one rule 80 applicable to the service request. The inference engine 16 may process the rules 18 to determine action to take based on the outcome of the rule processing.

One rule may indicate a technical parameter, such as a technical property that must be supported or available at the resource manager 4a, 4b, 4c. Technical parameters may include a minimum amount of available resources (e.g., storage, computational, etc.) at the resource manager 4a, 4b, 4c, minimum connection bandwidth, supported protocols and required features, etc. A technical parameter specifies a technical feature that is a prerequisite for the resource manager 4a, 4b, 4c to be available to provide the requested service. If (at block 106) there is least one rule 80 applicable to the service request having a technical parameter, then a determination is made (at block 108) whether a least one resource manager publishing the requested service satisfies the technical parameter. The resource manager information 70 for the resource managers 4a, 4b, 4c may be processed to determine whether a certain technical parameter is satisfied. If not, an error message is returned (at block 110) that the service is not available.

A check is also made (at block 112) as to whether one rule applicable to the service request includes a quality of service parameter, which may be part of a Service Level Agreement (SLA). A quality of service parameter specifies a requirement that the resource manager 4a, 4b, 4c must satisfy to provide a certain level of performance to the subscriber, such as a required connection bandwidth, a maximum number of currently connected users, a minimum amount of available computational resources, a specified hardware redundancy, performance requirements of the resource manager hardware, etc. The quality of service parameter may specify both a minimum amount of performance or service as well as a maximum. If (at block 112) there is one applicable rule having a quality of service parameter, then the coordinator 6 determines (at block 114) whether at least one resource manager publishing the requested service satisfies the quality of service parameter. The resource manager information 70 for the resource managers 4a, 4b, 4c may be reviewed to determine whether a certain quality of service parameter is satisfied. If not, control proceeds to block 110 to return the message that the service is not available.

The coordinator 6 may also check (at blocks 116 and 120 in FIG. 5b) whether there are any rules 80 applicable to the requested service having business parameters. A business parameter may specify a security level or group membership that the subscriber 4a, 4b and/or resource manager 4a, 4b, 4c must satisfy in order to access and/or be selected to provide, respectively, the requested service. A business parameter may also specify other corporate or organizational policies, such as requiring that certain files being archived in storage be stored in a specific location depending on the type, size, access frequency, classification, etc. of the file. If (at blocks 116 and 120) there is a rule having a business parameter and if (at block 118) at least one resource manager 4a, 4b, 4c publishing the requested service and/or if (at block 122) at least one requesting subscriber 8a, 8b does not satisfy the specified quality of service parameter, then control proceeds to block 110 to return the message that the service is not available. The resource manager information 70 for the resource managers 4a, 4b, 4c may be processed to determine whether a certain business parameter is satisfied.

If all the applicable rules are satisfied by at least one resource manager 4a, 4b, 4c and the subscriber 8a, 8b (should rules apply to the subscriber), then the coordinator 6 selects (at block 124) one determined resource manager 4a, 4b, 4c satisfying all the applicable rules to provide the requested service to the subscriber 8a, 8b. If there are multiple resource managers 4a, 4b, 4c satisfying the applicable rules, then the coordinator 6 may use a selection technique to select one resource provider, such as round robin, load balancing based on resource availability and usage at the resource managers 4a, 4b, 4c, etc.

Figure 6:
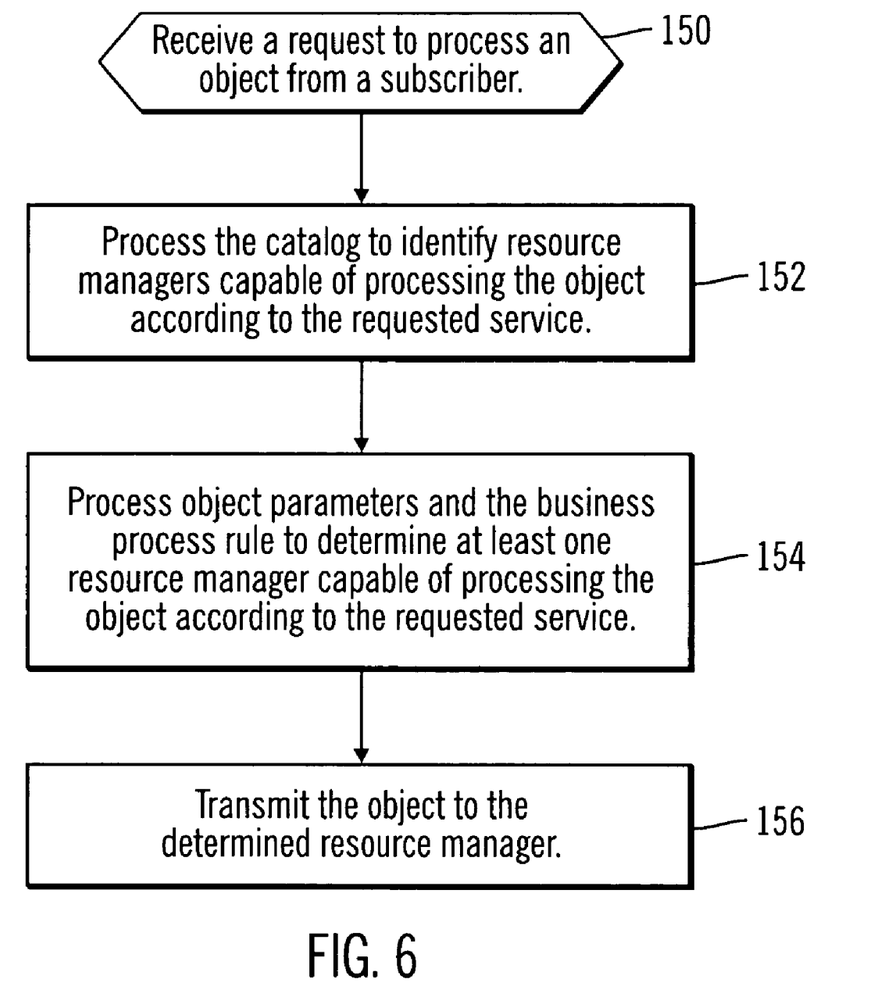
FIG. 6 illustrates an embodiment of operations performed to implement a business process rule to select a resource manager to provide a service to the subscriber.

FIG. 6 illustrates an embodiment of operations performed by the coordinator 6 to implement a business process rule that is used to determine the processing and handling of an object. Control begins at block 150 when the coordinator 6 receives (at block 150) a request from a subscriber 8a, 8b to process an object. The subscriber 8a, 8b may comprise a program interfacing with a file system, database application, mail server, data repository, etc., to determine how to process objects, files, etc., within the repository The business process rules provide policies, such as archival and retention policies, to determine whether any special handling of the objects are required. For instance, the subscriber may comprise a "grabber" that accesses emails and requests a service from the coordinator 6 to determine whether the emails need to be archived, stored, flagged or otherwise handled according to the archival and retention policies of the organization. Additionally, the subscriber may interface with a file system that requests a service from the coordinator 6 to apply archival and retention policies to files in the file system to implement business objectives.

Upon receiving the service request with respect to an object (e.g., file, record, email, etc.) having an applicable business process rule, the coordinator 6 processes (at block 152) the catalog 12 to identify resource managers 4a, 4b, 4c capable of processing the object according to the requested service. The coordinator 6 further processes (at block 154) object parameters and the business process rule to select at least one resource manager 4a, 4b, 4c to process the object. The business process rule may further specify requirements of the resource manager 4a, 4b, 4c to receive the object for archival or storage. The object is then transmitted (at block 156) to the determined resource manager. In one embodiment, the resource managers 4a, 4b, 4c may comprise computer readable devices, wherein the business process rule specifies retention and archival policies that selects one computer readable media in which to store the object based on the object parameters. For instance, the object parameters of the object may indicate the object size, access frequency (e.g., very high, high, frequent, low, etc.), desired availability (high availability, on-line, near online, etc.), coding (e.g., file format, compression, encryption, etc.), subject matter, etc. The business process rule may then specify different types of computer readable media, e.g., tape, hard disk drive, memory, etc., in which to store the object based on conditions related to the object parameters. For instance, if the object access frequency is relatively high, then the object may be stored in memory; if the size is large or the access frequency is low, then the object may be stored on tape; if the access frequency is high and the object is of a certain type, then the object may be stored in a file system; if the object access frequency is high and the object is required to be highly available, then the object may be stored in a disaster recovery or mirror site. Additionally, if the object parameters indicate that the object is related to a certain subject matter, e.g., litigation or transactional related, then the object may be archived for a period of time as specified by the business policy requirements. In this way, a business process rule specifies conditions and target storage and memory locations to store objects subject to a service request so as to implement archival and retention policies.

In one embodiment, the service may comprise an online file sharing service and the catalog 12 provides information on files, e.g., multi-media files, programs, etc., that subscribers 8a, 8b may download. The rules 18 may then be used to select an appropriate resource manager 4a, 4b, 4c that publishes the requested service, i.e., file, to have that appropriate resource manager transfer the file to the subscriber 8a, 8b.

In yet a further embodiment, the service may comprise a request to upload files to a content management system, where a business process rule based on the object parameters of the file being uploaded routes the file to an appropriate storage location in the content management system based on the object parameters, such as file size, access frequency, and other classifications.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by one station and received by another station, where the code or logic encoded in the transmission signal may be decoded and stored in hardware or a computer readable medium. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described embodiment provided specific example of rules that may be used to select a resource manager to provide a requested service. In alternative embodiments, additional types of rules and combinations of rules may be implemented and used to select a resource manager based on properties and qualities of the resource manager and/or subscriber.

FIGS. 2, 3, and 4 illustrate information provided with catalog entries, resource manager information entries and rules. In additional embodiments, different and additional types of information and information in different formats may be provided in the catalog, resource manager information, and rules than shown.

The illustrated operations of FIGS. 5 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing a catalog at a coordinator system indicating a plurality of resource managers and at least one service offered by the resource managers;
providing, at the coordinator system, resource manager information indicating resource availability information for resource managers offering at least one service;
receiving, at the coordinator system, a request for a data service, to store or retrieve an object, from a subscriber, wherein the coordinator system communicates with the resource manager and the subscriber over a network;

processing, by the coordinator system, the catalog to identify resource managers publishing the requested data service;

determining, by the coordinator system, from a plurality of rules the rules that are applicable to the request for the requested data service;

using, by the coordinator system, an inference engine to process the resource manager information to determine at least one identified resource manager publishing the requested service that also satisfies the rules that are applicable to the service request, wherein at least one of the plurality of rules applicable to the service request comprises:

a business parameter concerning an attribute of the service request that is not related to the technical performance of the resource manager that must be satisfied by the subscriber initiating the request; and a parameter concerning properties of the object subject to the service request, wherein the properties of the object include at least one of a set of properties including object access frequency, object size, and object compression, wherein the resource manager selected by the rule is based on the properties of the object;

determining at least one identified resource manager that has resource manager information that satisfies the parameter concerning the properties of the object; and determining whether the subscriber satisfies the business parameter, wherein access to one of the at least one determined resource manager publishing the service is permitted in response to determining that the subscriber satisfies the quality of service business parameter.

2. The method of claim 1, wherein the set of properties further includes: a minimum amount of available storage at the resource manager, a minimum amount of available computational resources at the resource manager, a minimum amount of connection bandwidth available at the resource manager, and technical specifications that must be supported by the resource manager.

3. The method of claim 1, wherein at least one rule applicable to the service request indicates a quality of service parameter, and wherein processing the resource manager information to determine at least one resource manager comprises:

determining at least one resource manager publishing the requested service that is capable of providing the requested service to the subscriber and that satisfies the quality of service parameter applicable to the service request.

4. The method of claim 3, wherein the quality of service parameter specifies one of the quality of service parameters that are a member of a set of quality of service parameters comprising: a required hardware redundancy available at the resource manager; a required connection bandwidth available at the resource manager; a required computational resource availability at the resource manager; and a maximum number of connected users at the resource manager.

5. The method of claim 1, wherein the business parameter specifies a required security level at the resource manager.

6. The method of claim 1, wherein the business parameter specifies one of the business parameters that is a member of a set of business parameters comprising: an access level required of the subscriber to the service or the resource manager publishing the service and a required account status associated with the subscriber.

7. The method of claim 1, wherein the requested service comprises a request to process an object, wherein at least one rule comprises a business process rule for processing the object subject to the service request, comprising:

processing object parameters and the business process rule to select at least one resource manager to process the object; and transmitting the object to the determined resource manager.

8. The method of claim 7, wherein the resource managers comprise computer readable storage devices, wherein the business process rule specifies a retention and archival policy that selects one computer readable storage device in which to store the object based on the object parameters.

9. The method of claim 8, wherein the services published by resource managers include data storage services, data access services to access files, and computational services to execute processes.

10. The method of claim 1, wherein the business parameter comprises an organizational policy for storing files.

11. A system in communication with a subscriber and a plurality of resource managers over a network, wherein each resource manager offers at least one service, comprising:

a processor;

a memory accessible to the processor, including:

a catalog indicating the resource managers and the at least one service offered by the resource managers;

resource manager information indicating resource availability information for the resource managers offering at least one service;

a computer readable medium including coordinator code executed by the processor to perform:

receiving a request for a data service, to store or retrieve an object, from a subscriber;

processing the catalog to identify resource managers publishing the requested data service;

determining from a plurality of rules the rules that are applicable to the request for the requested data service;

using an inference engine to process the resource manager information to determine at least one identified resource manager publishing the requested service that also satisfies the rules that are applicable to the service request, wherein at least one of the plurality of rules applicable to the service request comprises:

a business parameter concerning an attribute of the service request that is not related to the technical performance of the resource manager that must be satisfied by the subscriber initiating the request; and a parameter concerning properties of the object subject to the service request, wherein the properties of the object include at least one of a set of properties including object access frequency, object size, and object compression, wherein the resource manager selected by the rule is based on the properties of the object;

determining at least one identified resource manager that has resource manager information that satisfies the parameter concerning the properties of the object; and determining whether the subscriber satisfies the business parameter, wherein access to one of the at least one determined resource manager publishing the service is permitted in response to determining that the subscriber satisfies the quality of service business parameter.

12. The system of claim 11, wherein the set of properties further includes: a minimum amount of available storage at the resource manager, a minimum amount of available computational resources at the resource manager, a minimum amount of connection bandwidth available at the resource manager, and technical specifications that must be supported by the resource manager.

13. The system of claim 11, wherein at least one rule applicable to the service request indicates a quality of service parameter, and wherein processing the resource manager information to determine at least one resource manager comprises:
  determining at least one resource manager publishing the requested service that is capable of providing the requested service to the subscriber and that satisfies the quality of service parameter applicable to the service request.

14. The system of claim 13, wherein the quality of service parameter specifies one of the quality of service parameters that are a member of a set of quality of service parameters comprising: a required hardware redundancy available at the resource manager; a required connection bandwidth available at the resource manager; a required computational resource availability at the resource manager; and a maximum number of connected users at the resource manager.

15. The system of claim 11, wherein the business parameter specifies a required security level at the resource manager.

16. An article of manufacture comprising a computer readable storage medium having coordinator code executed to communicate with resource managers and a subscriber over a network and to perform operations, the operations comprising:
  providing a catalog indicating the resource managers and at least one service offered by the resource managers;
  providing resource manager information indicating resource availability information for resource managers offering at least one service;
  receiving a request for a data service, to store or retrieve an object, from a subscriber;
  processing the catalog to identify resource managers publishing the requested data service;
  determining from a plurality of rules the rules that are applicable to the request for the requested data service;
  using an inference engine to process the resource manager information to determine at least one identified resource manager publishing the requested service that also satisfies the rules that are applicable to the service request, wherein at least one of the plurality of rules applicable to the service request comprises:
    a business parameter concerning an attribute of the service request that is not related to the technical performance of the resource manager that must be satisfied by the subscriber initiating the request; and
    a parameter concerning properties of the object subject to the service request, wherein the properties of the object include at least one of a set of properties including object access frequency, object size, and object compression, wherein the resource manager selected by the rule is based on the properties of the object;
  determining at least one identified resource manager that has resource manager information that satisfies the parameter concerning the properties of the object; and
  determining whether the subscriber satisfies the business parameter, wherein access to one of the at least one determined resource manager publishing the service is permitted in response to determining that the subscriber satisfies the quality of service business parameter.

17. The article of manufacture of claim 16, wherein the set of properties further includes: a minimum amount of available storage at the resource manager, a minimum amount of available computational resources at the resource manager, a minimum amount of connection bandwidth available at the resource manager, and technical specifications that must be supported by the resource manager.

18. The article of manufacture of claim 16, wherein at least one rule applicable to the service request indicates a quality of service parameter, and wherein processing the resource manager information to determine at least one resource manager comprises:
  determining at least one resource manager publishing the requested service that is capable of providing the requested service to the subscriber and that satisfies the quality of service parameter applicable to the service request.

19. The article of manufacture of claim 18, wherein the quality of service parameter specifies one of the quality of service parameters that are a member of a set of quality of service parameters comprising: a required hardware redundancy available at the resource manager; a required connection bandwidth available at the resource manager; a required computational resource availability at the resource manager; and a maximum number of connected users at the resource manager.

20. The article of manufacture of claim 16, wherein the business parameter specifies a required security level at the resource manager.

21. The article of manufacture of claim 16, wherein the requested service comprises a request to process an object, wherein at least one rule comprises a business process rule for processing the object subject to the service request, comprising:
  processing object parameters and the business process rule to select at least one resource manager to process the object; and
  transmitting the object to the determined resource manager.

* * * * *